United States Patent
Ishimoto

(10) Patent No.: US 7,620,075 B2
(45) Date of Patent: Nov. 17, 2009

(54) SERIAL COMMUNICATION SYSTEM WITH BAUD RATE GENERATOR

(75) Inventor: Satomi Ishimoto, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 345 days.

(21) Appl. No.: 11/806,006

(22) Filed: May 29, 2007

(65) Prior Publication Data

US 2007/0291887 A1 Dec. 20, 2007

(30) Foreign Application Priority Data

May 30, 2006 (JP) .............................. 2006-149639

(51) Int. Cl.
*H04J 1/16* (2006.01)
*H04J 3/06* (2006.01)

(52) U.S. Cl. .................... 370/503; 370/252; 370/419

(58) Field of Classification Search ............... 370/503, 370/252, 419
See application file for complete search history.

(56) References Cited

FOREIGN PATENT DOCUMENTS

JP 2001-69194 3/2001

*Primary Examiner*—John Pezzlo
(74) *Attorney, Agent, or Firm*—McGinn IP Law Group, PLLC

(57) ABSTRACT

A baud rate generator includes a first counter, a timer and a baud rate correcting circuit. The first counter is configured to count bits of an inputted serial data. The timer is configured to measure a time for which the first counter counts a predetermined number of bits based on a reference clock signal. The baud rate correcting circuit is configured to output a baud rate correction value based on the measurement time by the timer such that a baud rate in a serial communication is corrected based on the baud rate correction value.

20 Claims, 12 Drawing Sheets

SERIAL COMMUNICATION SYSTEM WITH BAUD RATE GENERATOR

BACKGROUND OF THE INVENTION

1. Field of the Invention

The present invention relates to a serial communication system, and more particularly to correction of a baud rate in serial communication.

2. Description of Related Art

Recently, there has been a wide spread of a control system onboard network for connecting ECUs (Electronic Control Units) which are mounted on automobiles. As the communication protocols of a typical control system onboard network system, there are CAN (Controller Area Network), LIN (Local Interconnect Network), and FlexRAY. The CAN is mainly employed as a standard specification of a power train system network or a chassis system network. The LIN is employed as a standard specification of a body system serial communication network that is used at a relatively low speed (transmission rate of 1 to 20 kbps). Further, the FlexRAY is standardized to correspond to X-by-wire applications.

The LIN is a serial communication protocol that has been standardized by the LIN consortium for achieving communication with high cost performance between various sensors and actuators having a high-grade function in an onboard network system. The LIN is used for communication between apparatuses which do not require as much band widths and versatility as the CAN does. For example, it is used as a communication path for supplying data to the CAN from various sensors. Further, it is lower at cost compared to the CAN and the FlexRAY.

In the standard of LIN, used is an UART (Universal Asynchronous Receiver Transmitter) interface that has already become popular as a communication system. Network topology is not specifically defined for the LIN, but bus topology is employed basically. The LIN includes a single master node and a plurality of slave nodes, which are connected mutually via a bus. Currently, the maximum number of slave nodes that can be connected to a single master node is defined as fifteen. A micro controller unit provided with a CPU is an example of the master node and slave nodes. In the master node, a program for executing a master task and a program for executing a slave task are stored in a storage unit. The master task is a task that determines the transfer timing and transfer destination of frames. The slave task prepares a data field for transfer by each frame. The slave node executes only the slave task, so that the slave task program is stored in the storage unit thereof. The master program may be stored in the storage unit of the slave node. It is easy to control a program so as not to execute the master program when operating as the slave node. The CPU of the master node executes the master task to transmit a frame header to the slave node. The CPU of the slave node executes the slave task to respond to the frame header, and transmits a response (including a data field). The master node can also execute the slave task, so that it can transmit a response including the data field after transmission of the header.

The frame header transmitted from the master node to the slave node includes a synch brake field (brake field), a synch field (synchronous byte), and an ID field (protection ID) in order. Further, following the header, a response including a data filed of 8 bytes at the maximum and a checksum of 1 byte is transferred. The brake field is composed of a low level (dominant level) of 13 bits or more. The synch field has 0x55 data value of 8 bits. The ID field is constituted with ID of 6 bits and parity of 2 bits.

An access system of the LIN is a time trigger system. Thus, a message sequence is set in the master task in advance as a transfer schedule. The master node can manage the network by executing an application as LIN clusters. That is, all the tasks within the LIN are managed on the basis of time, so that there is no collision between messages as long as synchronization is maintained.

The establishment of synchronization in the LIN is to correct the period of sampling clocks for obtaining or transmitting serial data to meet with the reference period. Normally, a baud rate of the slave node is corrected to coincide with a baud rate of the master node to achieve synchronization. The slave node corrects the baud rate based on the reference clock (synch field) transmitted from the master node. Correction of the baud rate is performed every time a header arrives.

A baud rate correcting method according to a conventional technique will be described by referring to FIG. 1. FIG. 1 is a block diagram showing the configuration of a baud rate generator 120 according to the conventional technique. The baud rate generator 120 in the slave node according to the conventional technique corrects the baud rate by executing software for baud rate correction. More specifically, the baud rate generator 120 includes a baud rate initial value setting register 126 for storing a baud rate set value 135, a counter 128 which counts system clocks 1101 generated by a clock generator 111, and outputs the number as a counter value 137, and a coincidence detecting circuit 129 that outputs a coincidence detecting signal 138 to an I/O interface 140. The coincidence detecting signal 138 is used for determining the baud rate at a timing where the baud rate set value 135 and the counter value 137 are coincident with each other. The baud rate set value 135 is calculated by an arithmetic operation of a CPU 110, and it is ½-bit period time (a half of the time of 1 bit), for example. The CPU 110 of the slave node executes an interruption process for correcting the baud rate in response to the synch brake field supplied from the master node. In this interruption process, the CPU 110 starts up a timer placed outside the serial communication circuit, measures the period of the synch field, and calculates the baud rate set value 135 from the measured result. At that time, the CPU 110 stops the serial communication, resets the baud rate set value 135 to the baud rate initial value setting register 126, and corrects the baud rate. The CPU 110 restarts the serial communication after correcting the baud rate. As described, the slave node according to the conventional technique temporarily terminates the communication process, and corrects the baud rate through the arithmetic operation performed by the CPU 110.

Further, as a related art, Japanese Laid Open Patent Publication (JP-P2001-069194A) discloses a baud rate setting method in serial communication. In the baud rate setting method described of the related art, the predetermined pulse width of a pulse signal is counted by a timer, and the operation frequency of an apparatus is calculated from the count value. Then, the baud rate is set in accordance with the calculated operation frequency. At that time, a relation $\phi=(n \times m)/T$" is met, where the pulse width is T, the CPU operation frequency within the apparatus is $\phi$, the frequency dividing ratio of the timer with respect to the CPU operation frequency $\phi$ is n, and a counter value of the timer is m. Therefore, the operation frequency $\phi$ is calculated and resetting of the baud rate is performed.

In baud rate correction according to the conventional technique, the CPU of the slave node executes the software for baud rate correction. When measuring the period of the synch field, it is necessary to start up a timer placed outside the serial communication circuit. Further, the baud rate correction set value, for example, ½-bit period time is calculated through the arithmetic processing by the CPU, by using the measured result of the synch field period. Thus, when the baud rate correction is performed, there is a large load imposed upon the CPU, and it is required to perform processes such as starting up the timer outside the serial communication circuit and stopping the serial communication circuit. Since it requires time to perform such processes, a wait time from the synch field to the ID field needs to be set longer. This deteriorates the transfer speed.

In the method described in Japanese Laid Open Patent Publication (JP-P2001-069194A), the operation frequency is calculated by measuring the pulse width. However, in the LIN, since the low level and the high level continue alternately in the synch field having the 0x55 data, an accurate baud rate based on the protocol cannot be determined even if the low level width of one bit is calculated. Further, there is no guarantee that the pulse width T can be divided by a timer period t with no remainder, so that the calculated operation frequency includes an error. Therefore, it is not suitable for finely adjusting the baud rate error that is generated due to a difference in the operation frequency between the master node and the slave node. Furthermore, this method employs incrementing the counter value m in an interruption process performed for every timer period t, which increases a load imposed upon the CPU.

SUMMARY

In a first embodiment of the present invention, a baud rate generator includes a first counter, a timer and a baud rate correcting circuit. The first counter is configured to count bits of an inputted serial data. The timer is configured to measure a time for which the first counter counts a predetermined number of bits based on a reference clock signal. The baud rate correcting circuit is configured to output a baud rate correction value based on the measurement time by the timer such that a baud rate in a serial communication is corrected based on the baud rate correction value.

In a second embodiment of the present invention, a serial communication apparatus includes a clock generator configured to generate a reference clock signal; an I/O interface circuit configured to operate in response to a coincidence detection signal; a CPU executing a program for a slave task; and a baud rate generator. The baud rate generator includes a first counter configured to count bits of a serial data received by the I/O interface circuit; a timer configured to measure a time for which the first counter counts a predetermined number of bits based on a reference clock signal; and a baud rate correcting circuit configured to output a baud rate correction value based on the measurement time such that a baud rate of a serial communication in the I/O interface circuit is corrected based on the baud rate correction value.

In a third embodiment of the present invention, a method is provided of correcting a baud rate in a serial communication in a serial communication system comprising at least a master node and a plurality of slave nodes. The method is achieved by transmitting a serial data from the master node to the plurality of slave nodes; and by correcting a baud rate in each of the plurality of slave nodes. The correcting a baud rate is achieved by receiving the serial data; by counting bits of the received serial data received; by generating a reference clock signal; by measuring a time for which a predetermined number of bits are counted, from the reference clock signal; by determining a baud rate correction value based on the measurement time; and by correcting the baud rate based on the baud rate correction value as a selection value and the reference clock signal.

In the serial communication system of the present invention, it is possible to lighten the load upon a CPU within the node at the time of correction of the baud rate. Further, it is possible to improve the transfer speed of the serial communication, and it is possible to reduce the baud rate error in the slave node.

BRIEF DESCRIPTION OF THE DRAWINGS

The above and other subjects, advantages and features of the present invention will be more apparent from the following description of certain embodiments taken in conjunction with the accompanying drawings, in which.

DESCRIPTION OF THE PREFERRED EMBODIMENTS

Figure 1:
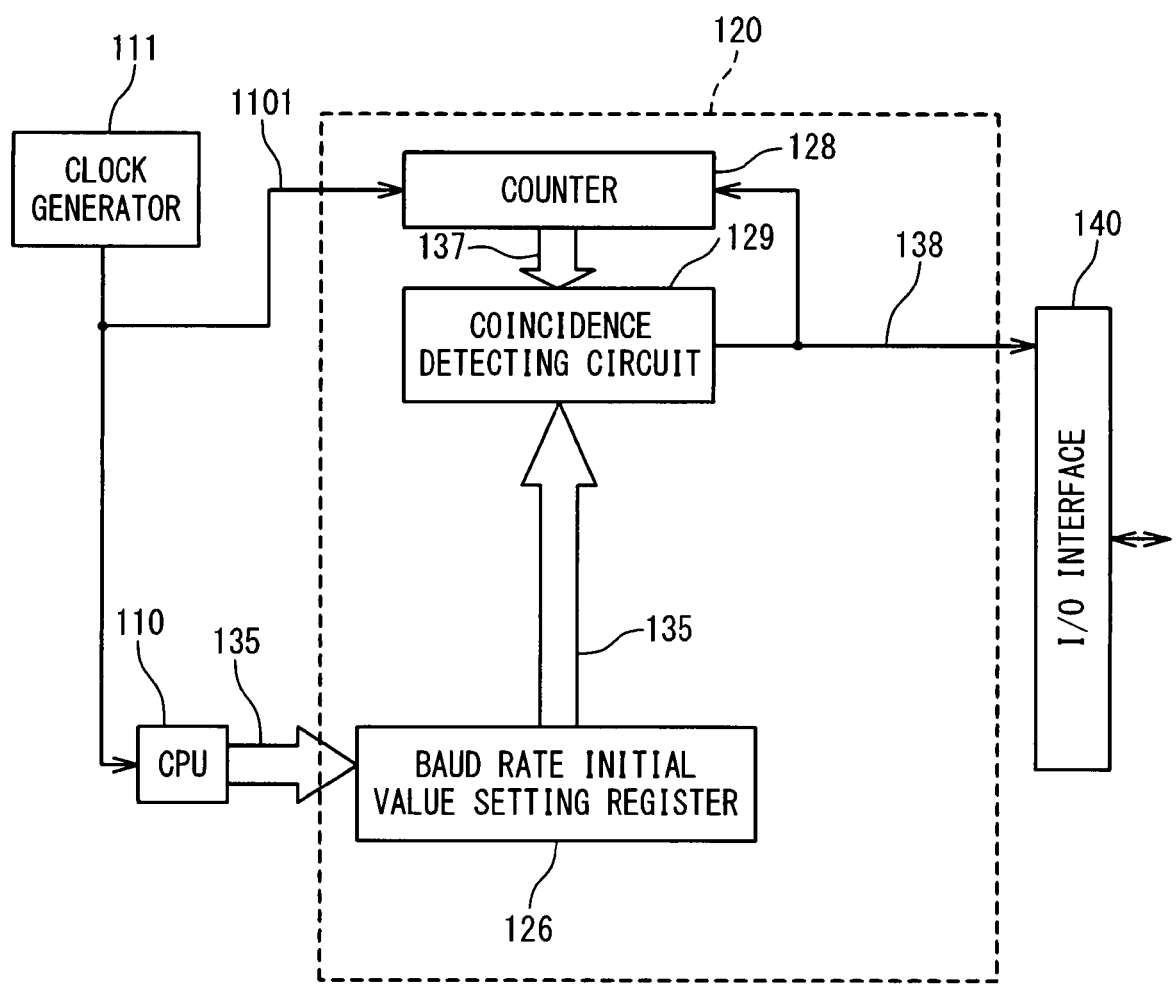
FIG. 1 is a block diagram showing the configuration of a baud rate generator in a conventional example.

Hereinafter, a serial communication system according to the present invention will be described in detail with reference to the attached drawings. In the drawings, the same or similar reference numerals indicate the same, similar, or equivalent components.

Figure 2:
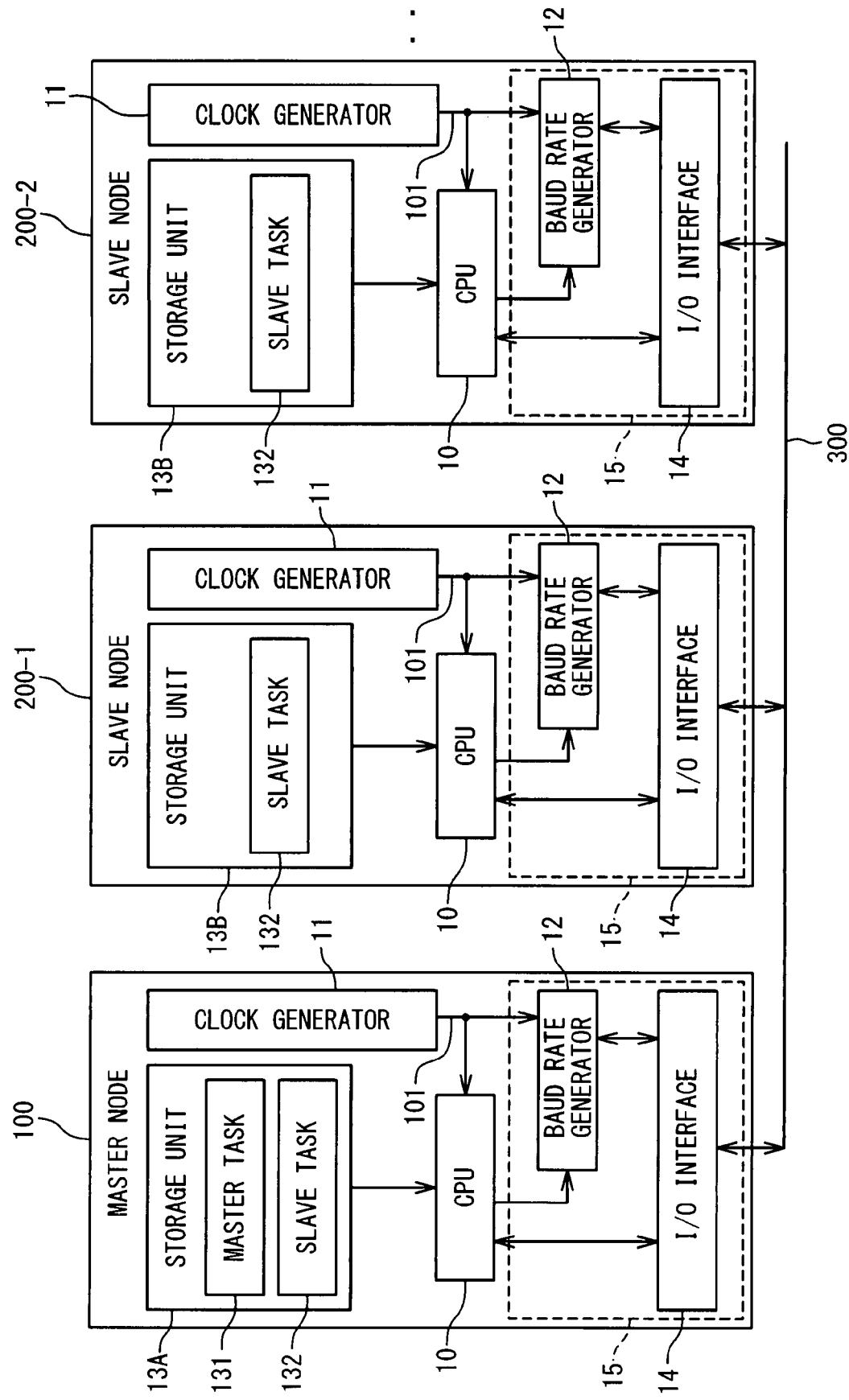
FIG. 2 is a block diagram showing a serial communication system according to a first embodiment of the present invention.

FIG. 2 is a block diagram showing a configuration of the serial communication system according to a first embodiment of the present invention. Referring to FIG. 2, a LIN (Local Interconnect Network) communication system that uses a LIN communication protocol will be described as an example of the serial communication system of the first embodiment. The serial communication system of the present invention includes a single master node 100 and a plurality of slave nodes 200 (200-1, 200-2, . . . ) and they are all connected to a bus 300. In the first embodiment, micro controller units (MCU) are used as examples of the master node 100 and the slave nodes 200. The configuration and the operation are same over the salve nodes 200. Thus, only the slave node 200 will be described below. Further, the same reference numerals are assigned to the components having the same configuration and performing the same operation. It should be noted that although the description is given under the condition that the slave nodes 200 have the same configuration, they have individual configurations, respectively. Therefore, if the slave nodes can attain functions of the present invention, the components such as a CPU and a clock generator in the slave nodes may not necessarily have the same components.

Referring to FIG. 2, the master node 100 includes a CPU 100, a clock generator 11, a serial communication circuit 15, and a storage unit 13A. The serial communication circuit 15 is a serial communication interface, e.g. UART. The serial communication circuit 15 includes a baud rate generator 12 and an I/O interface 14. The I/O interface 14 performs serial communication with the slave node 200 based on the baud rate determined by the baud rate generator 12.

A master task 131 and a slave task 132 are stored in the storage unit 13A of the master node 100. The master task 131 determines the transfer timing and transfer destination of a frame, and the slave task 132 prepares a data field to be transferred by each frame. More specifically, a program for the master task 131 and a program for the slave task 132 are stored in the storage unit 13A, and the CPU 10 executes the respective programs to achieve the functions of the master task 131 and the slave task 132. A message sequence is set in the master task 131 in advance as a transfer schedule. The CPU 10 of the master node 100 generate a frame header and transmits it to the slave nodes 200 via the I/O interface 14, and receives a response from the slave node (for example, slave node 200) that is designated by the frame header via the I/O interface 14. The slave task 132 prepares the data field to be transferred by each frame.

Referring to FIG. 2, the slave node 200 includes the CPU 10, a clock generator 11, a serial communication circuit 15, and a storage unit 13B. The configuration of the slave node 200 is the same as that of the master node 100 except for the storage unit 13B. That is, it is different from the master node 100 in that there is no master task 131.

The storage unit 13B stores a slave program 132 peculiar to the slave node. The CPU 10 of the slave node 200 achieves the functions of the slave task 132 by executing the slave program. The slave node 200 prepares a response to be transferred, based on the frame header transferred from the master node 100. More specifically, the CPU 10 generates a response by executing the slave task 132, and transfers it to the master node 100 and the slave nodes 200 via the I/O interface 14. Further, the slave task 132 can receive responses from the master node 100 and the other slave nodes 200, in addition to transmitting the response. The master program may be stored in the storage unit 13B of the slave node 200. It can be simply controlled on the program so as not to execute the master program, when operating as the slave node.

The clock generators 11 of the master node 100 and the slave node 200 are the circuits, which output system clocks 101 to the CPU 10 and the baud rate generator 12. The clock generator 11 generates the system clock 101 based on oscillation output that is generated by connecting a crystal oscillator to an external connection terminal, for example. The CPU 10 executes various kinds of processes by having the system clock 101 as an operation clock. Further, the baud rate generator 12 determines the baud rate based on the system clocks 101. The I/O interface 14 converts a parallel data transferred from the CPU 10 into a serial data, and transfers it to the bus 300 in accordance with the baud rate determined by the baud rate generator 12. Alternatively, the I/O interface 14 samples the serial data transferred from the bus 300 in accordance with the baud rate, and converts the obtained data to parallel data to be transferred to the CPU 10.

The CPU 10 of the master node 100 transmits the frame header to the slave node 200 by executing the master task 131. Further, the CPU 10 can receive a response transmitted from the slave node 200 after the frame header, by executing the slave task 132. Alternatively, the CPU 10 can transmit the response to the salve node 200 after transmitting the frame header. The CPU 10 of the slave node 200 executes the salve task 132 to transmit the response to the master node 100 in response to the frame header transferred from the master node 100.

Next, referring to FIG. 5, the configuration of a frame slot will be described when the master node 100 transfers a response that contains a data field after a frame header. A frame slot transferred from the master node 100 to the slave node 200 includes a frame header and a response. The frame header includes a synch break field 41 (hereinafter, to be referred to as a break field 41), a synch field 42, and an identifier (ID) field 44. A predetermined length of wait time 43 is set between the synch field 42 and the ID field 44. The formats of the brake field 41 and the synch field 42 in the present embodiment are defined by the LIN communication protocol. That is, the brake field 41 transmitted from the master node 100 is a dominant level (low level) signal of 13 bits or more. The slave node 200 on a receiver side detects a low level of 11 bits or more, to determine as a break field. Similarly, the synch field 42 is a signal having the data value of 0x55 (hexadecimal number) between a start bit and a stop bit. That is, the synch field 42 includes the data of 8 bits in which the recessive level (high level) and the dominant level (low level) continue alternately. Further, the ID field 44 includes ID of 6 bits and parity of 2 bits. The wait time 43 is a time that is set arbitrarily in the message scenario within the master task 131.

The response transferred after the ID field 44 includes a data field 45 and a checksum field 46. The data field includes data fields $45_1$-$45_n$, each of which is composed of 8 bytes at the maximum. In the response, the checksum field 46 is provided at the end of the frame slot, i.e. after the last data field $45_n$. The checksum field 46 is used for detecting errors in data transmission.

For the I/O interface 14 according to the present embodiment, UART is used, for example. In this case, the UART frame format is employed for the frame transferred on the bus 300, except for the brake field 41.

The baud rate generator 12 of the slave node 200 corrects the own baud rate by using the synch field 42 that is transferred from the master node 100.

First Embodiment

Figure 3:
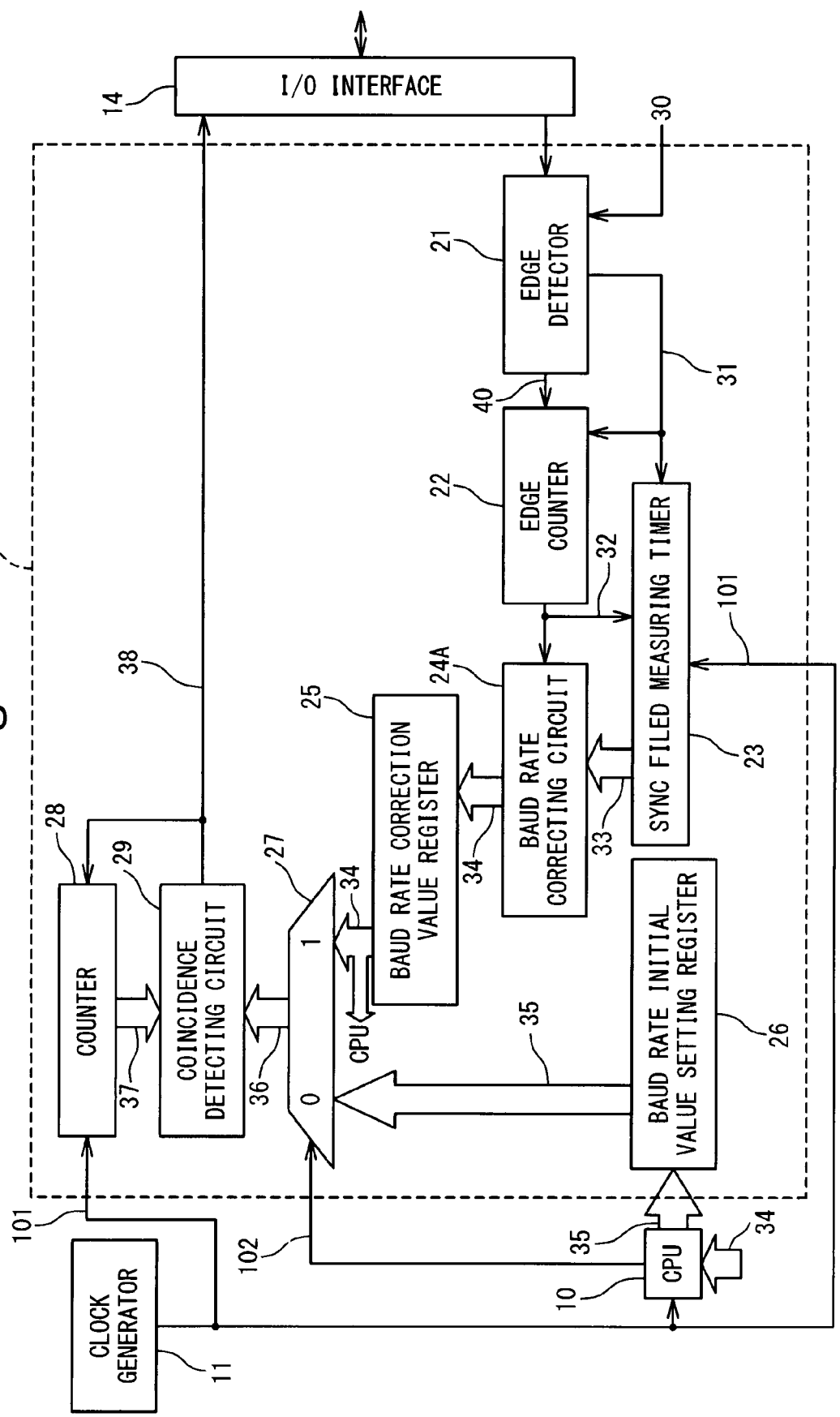
FIG. 3 is a block diagram showing the configuration of a baud rate generator in the serial communication system according to the first embodiment of the present invention.

FIG. 3 is a block diagram showing the configuration of a baud rate generator 12A in the serial communication system according to the first embodiment of the present invention. The master node 100 and the slave node 200 in the first embodiment include baud rate generators 12A in place of the baud rate generator 12.

Referring to FIG. 3, the baud rate generator 12A includes an edge detector 21, an edge counter 22, a synch field measuring timer 23, a baud rate correcting circuit 24A, a baud rate correction value register 25, a baud rate initial value setting register 26, a selector 27, a coincidence detecting circuit 29, and a counter 28.

When a synch brake field (L level of 11 bits or more) is supplied to the slave node 200, a synch brake field detection signal 30 is supplied to the edge detector 21 from a circuit (not shown). The edge detector 21 starts a falling edge detecting operation of the serial data on the bus 300 in response to the synch brake field detection signal 30. Upon detection of a falling edge of the start bit of the synch field 42, the edge detector 21 outputs a synch filed start signal 31 to the edge counter 22 and the synch field measuring timer 23. Also, the edge detector 21 outputs an edge detection signal 40 to the edge counter 22 every time detecting the falling edge of the synch field 42. The edge counter 22 counts the edge detection signal 40 to determine the number of falling edges of the synch field 42 in response to the synch field start signal 31. After counting the edge detection signal 40 from the reception of the synch field start signal 31 to a predetermined number of times, the edge counter 22 outputs a synch field end signal 32 to the synch field measuring timer 23 and the baud rate correcting circuit 24A. The synch field measuring timer 23 measures a time by counting the system clocks 101 supplied from the clock generator 11. Also, the synch field measuring timer 23 measures a time from the reception of the synch field start signal 31 to the reception of the synch field end signal 32 as a measurement time 33. That is, the synch field measuring timer 23 calculates a sum of 1-bit times in a predetermined number (n) of continuous serial data (hereinafter, to be referred to as an n-bit period) as the measurement time 33. The edge counter 22 of the present invention outputs the synch field end signal 32 after counting the falling edge four times from the reception of the synch field start signal 31. At this time, the synch field 42 has the value of 0x55, and the measurement time 33 is the count value of the system clocks 101 corresponding to the 8-bit period data.

The baud rate correcting circuit 24A extracts a predetermined unit bit period data for correcting the baud rate from the measurement time 33 in response to the synch field end signal 32, and stores a value, determined based on the extracted unit bit period, to the baud rate correction value register 25 as a baud rate correction value 34. The baud rate correcting circuit 24A according to the present invention stores ½-bit period data to the baud rate correction value register 25 as the baud rate correction value 34. The baud rate correction value register 25 outputs the stored baud rate correction value 34 to the selector 27. The CPU 10 can read the baud rate correction value 34 stored in the baud rate correction value register 25 via a read data line. Thus, the CPU 10 can know the current (corrected) baud rate when the baud rate correction value register 25 is selected in response to a baud rate selection signal 102.

Figure 4:
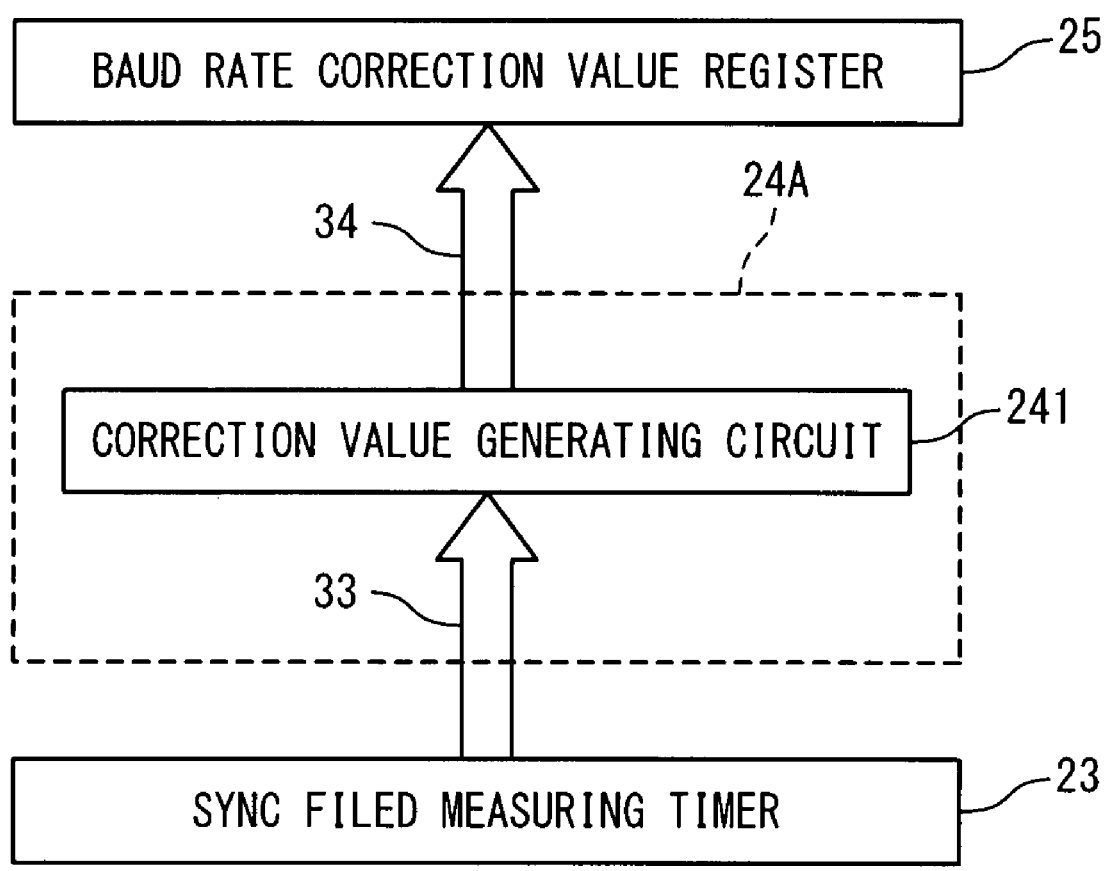
FIG. 4 is a block diagram showing the configuration of a baud rate correcting circuit of the baud rate generator in the first embodiment of the present invention.

FIG. 4 is a block diagram showing the configuration of the baud rate correcting circuit 24A according to the first embodiment. A correction value generating circuit 241 obtains the measurement time 33 from the synch field measuring timer 23. The measurement time 33 is a binary value. The correction value generating circuit 241 disregards the lower 4 bits of the measurement time 33 in response to the synch field end signal 32, and stores the higher 8 bits of the measurement time 33 in the baud rate correction value register 25 as the baud rate correction value 34. That is, the correction value generating circuit 241 extracts an average of the ½-bit period data based on the 8-bit period data of the synch field 42, and stores it to the baud rate correction value register 25.

In the meantime, the CPU 10 stores an initial value of the baud rate to the baud rate initial value setting register 26 as a baud rate set value 35. The baud rate set value 35 is a ½-bit period data that is set in advance based on the baud rate defined in the master task 131. The baud rate correction value 34 outputted from the baud rate correction value register 25 and the baud rate set value 35 outputted from the baud rate initial value setting register 26 are supplied to the selector 27. Based on the baud rate selection signal 102 outputted from the CPU 10, the selector 27 outputs either the baud rate correction value 34 or the baud rate set value 35 to the coincidence detecting circuit 29 as a baud rate selection output 36 that is used for setting the baud rate. For example, when the baud rate selection signal 102 is set to "0", the baud rate set value 35 is outputted as the baud rate selection output 36. When it is set to "1", the baud rate correction value 34 is outputted as the baud rate selection output 36. In case of the baud rate generator 12A of the master node 100, it is unnecessary to correct the baud rate based on the synch field 42. Thus, the baud rate selection signal 102 is set to "0". In this case, the baud rate selection signal 102 is directly outputted from the CPU 10 to the selector 27. However, a selection flag may be provided outside the CPU 10 (for example, inside the baud rate generator), and the CPU 10 may set the flag to "1" or "0" to supply it to the selector 27. Thus, it is unnecessary for the CPU 10 to output selection signal constantly.

The counter 28 counts the system clocks 101 outputted from the clock generator 11, and outputs a count value 37 to the coincidence detecting circuit 29. The coincidence detecting circuit 29 outputs a coincidence detection signal 38 to the I/O interface 14 when the baud rate selection output 36 and the counter value 37 are coincident with each other. That is, the coincidence detecting circuit 29 outputs the coincidence detection signal 38 to the I/O interface 14 at the ½ period that is corrected or set in advance.

The coincidence detection signal 38 is supplied to the I/O interface 14 and divided in frequency by a frequency dividing circuit (not shown), so as to generate a sampling clock for receiving the serial data and to generate a shift clock for transmitting the serial data. The I/O interface 14 receives the serial data supplied via the bus 300 in response to the sampling clock 39, and converts it to the parallel data. The converted data is read out by the CPU 10. Alternatively, the parallel data transferred from the CPU 10 is transferred onto the bus 300 as the serial data in response to with the shift clock.

Next, the baud rate correcting operation in the serial communication system according to the first embodiment of the present invention will be described.

Figure 7:
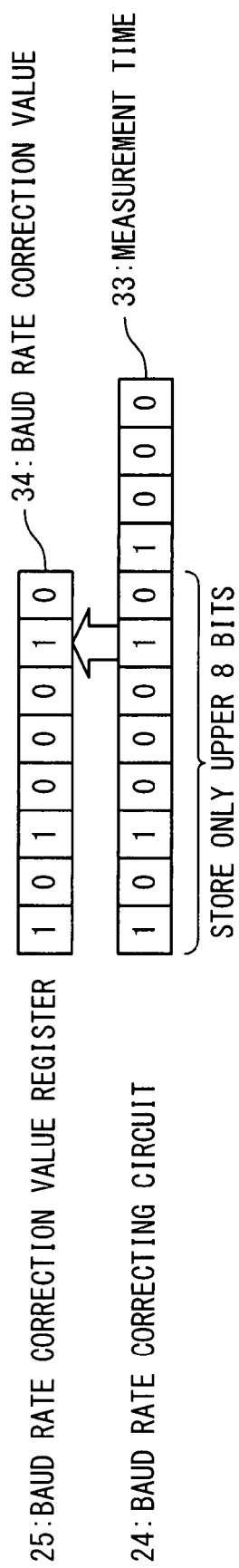
FIG. 7 is a diagram showing the measurement time supplied to the baud rate correcting circuit, and the baud rate correction value register of the present invention.
Figure 8:
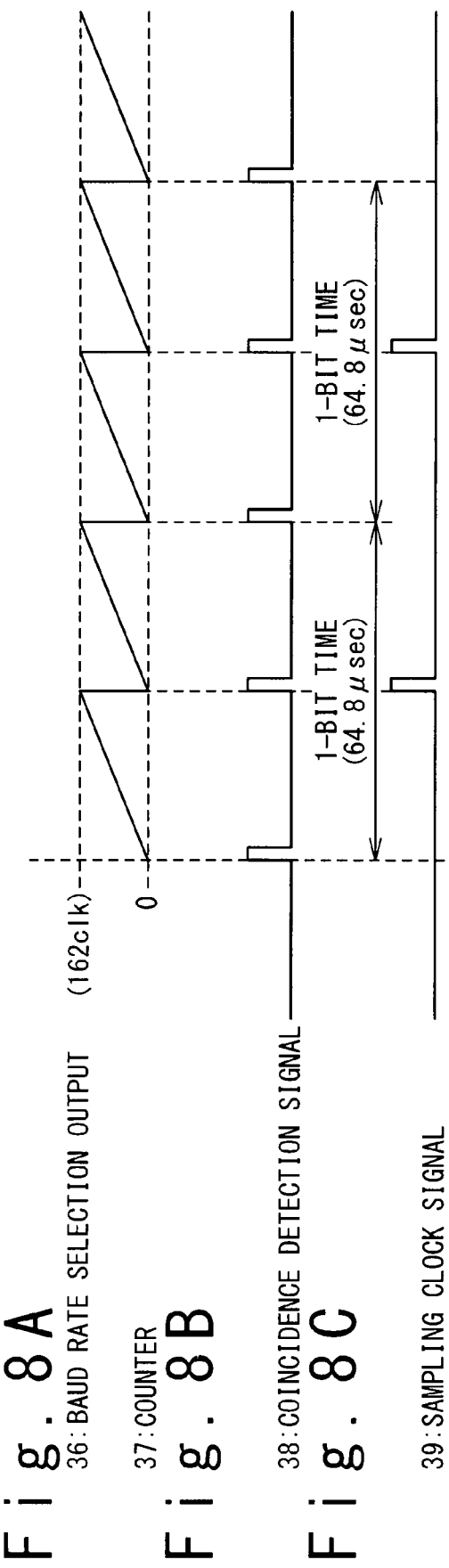
FIGS. 8A to 8C are timing charts showing a process of correcting the baud rate by using synchronized correction values.

FIGS. 6A to 6D are timing charts showing the measuring process of the measurement time 33 performed by the baud rate generator 12A according to the present invention. FIG. 7 is a diagram of the baud rate correction value register 25 to which the baud rate correction value 34 is stored from the baud rate correcting circuit 24A of the present invention. FIGS. 8A to 8C are timing charts showing a process performed for correcting the baud rate by using the baud rate correction value 34 outputted from the selector 27 as the baud rate selection output 36.

Now, an operation of the baud rate correcting process in the slave node 200, when a target baud rate in communication between the master node 100 and the slave node 200 is 15625 bps, and the system clock 101 of the slave node 200 is 5 MHz. Here, it is supposed that 1-clock period of the system clock 101 is expressed as 1 clk. In this case, 1 clk is 0.2 μsec, and 1-bit time is 320 clk. Accordingly, ½-bit period time is 160 clk, and "1010_0000B" (B indicates a binary value) as a binary value of 160 (decimal number) is set in the baud rate initial value setting register 26 of the slave node 200. Further, at the time of initial setting (before correcting the baud rate), "1010_0000B" is also set in the baud rate correction value register 25.

Figure 5:
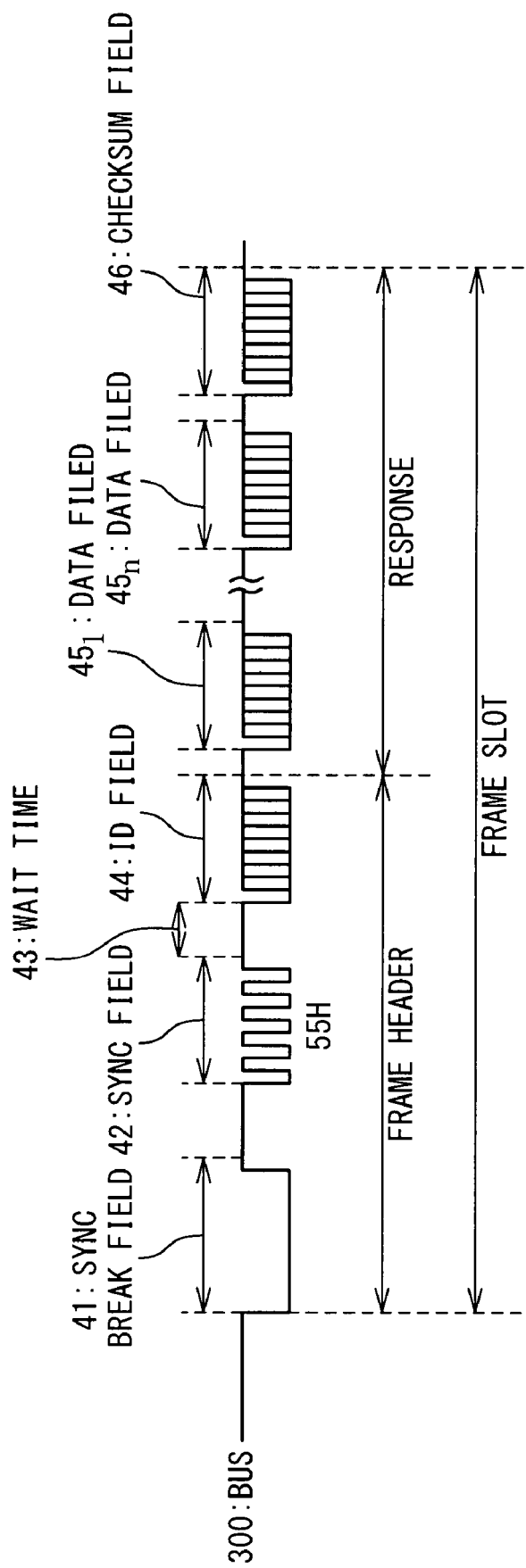
FIG. 5 is a diagram of a message frame transferred from a master node to a slave node.
Figure 6:
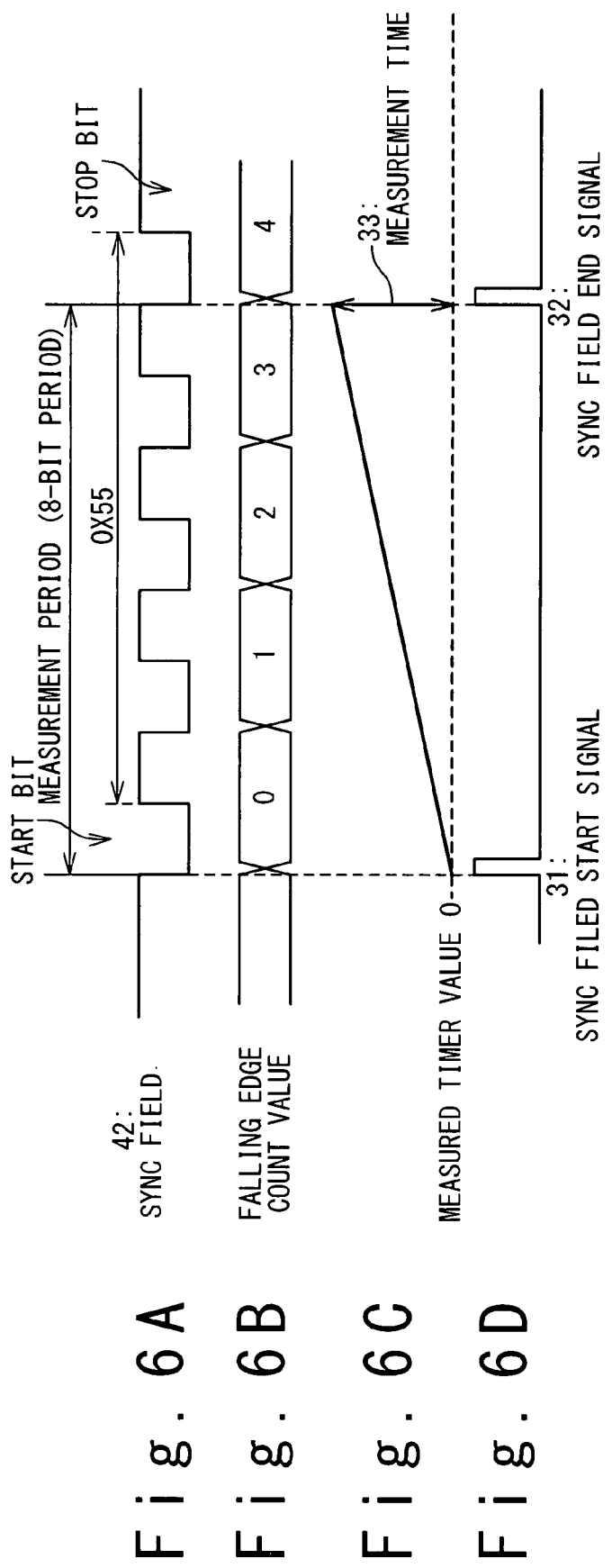
FIGS. 6A to 6D are timing charts showing a measuring process of a measurement time performed by the baud rate generator of the present invention.

Referring to FIG. 5, the master node 100 transfers the frame header including the synch field 42 to the slave node 200 via the bus 300. The edge detector 21 of the slave node 200 starts a measuring operation of the synch field 42 in response to the brake field detection signal 30. Upon detection of the start bit of the synch field 42, the edge detector 21 outputs the synch field start signal 31 to the edge counter 22 and the synch field measuring timer 23.

Referring to FIGS. 6A to 6D, the edge counter 22 counts the number of falling edges in the synch field 42 after receiving the synch field start signal 31. The synch field measuring timer 23 measures a time based on the system clocks 101 in response to the synch field start signal 31. Upon counting the fourth falling edge, the edge counter 22 outputs the synch field end signal 32 to the synch field measuring timer 23. The synch field measuring timer 23 ends the time measurement in response to the synch field end signal 32, and outputs the measurement time 33 to the baud rate correcting circuit 24A. That is, the synch field measuring timer 23 measures the time during which the falling edge is counted four times. Further, since the synch field 42 of the present embodiment is the data of 0x55, the measurement time 33 corresponds to the 8-bit period of the synch field 42.

When the baud rate of the master node 100 and that of the slave node 200 are coincident with each other, the measurement time 33 is "320 clk×8=2560 clk", i.e., the value of the synch field measuring timer 23 is "1010_0000_0000B". When the baud rate of the master node 100 and that of the slave node 200 are deviated from each other, it is necessary to correct the baud rate on the side of the slave node 200 in accordance with that of the master node 100.

Hereinafter, an operation of the baud rate correcting process when the measurement time 33 in the slave node 200 is "1010_0010_1000B" (=2600 clk), i.e., 1-bit time is "325 clk×0.2 µsec=65 µsec, and the measured baud rate is 15384.6 bps. In this case, an error rate of the baud rate of the slave node 200 to the actual baud rate of the master node 100 is 1.56% (=(15625−15384.6)/15384.6). The slave node 200 corrects the baud rate based on 2600 clk that is the measurement time for 8 bits.

As shown in FIG. 7, the correction value generating circuit 241 discards the lower 4 bits of the measurement time 33 "1010_0010_1000B", and automatically stores the higher 8 bits to the baud rate correction value register 25 as the baud rate correction value 34. That is, "1010_0010B" (=162 clk) is stored in the baud rate correction value register 25 as the baud rate correction value 34.

When the baud rate selection signal 102 supplied to the selector 27 is "1", the selector 27 outputs the baud rate correction value 34 to the coincidence detecting circuit 29 as the baud rate selection output 36. In the meantime, the counter 28 outputs the counter value 37 obtained by counting the system clocks 101 to the coincidence detecting circuit 29. When the baud rate selection output 36 is supplied from the selector 27 to the coincidence detecting circuit 29, the coincidence detection with the baud rate correction value 34 is performed. Referring to FIGS. 8A to 8C, the coincidence detecting circuit 29 outputs the coincidence detection signal 38, when the counter value 37 and the baud rate selection output 36 are coincident with each other. The counter 28 restarts the counting operation after the counter value 37 is cleared in response to the coincidence detection signal 38. In this manner, the coincidence detecting circuit 29 can output the coincidence detection signal 38 to the I/O interface 14 at the ½-bit period (162 clk). The coincidence detection signal 38 is frequency-divided into twice of frequency by a frequency dividing circuit (not shown), and supplied to the I/O interface 14 as the sampling clock 39 used for receiving serial data. In this case, the period of the sampling clock 39 is 324 clk=64.8 µsec. That is, the corrected baud rate becomes 15432.1 bps, and an error rate to the actual baud rate of the master node 100 can be suppressed to 0.3% (=(15432.1−15384.6)/15384.6).

As described above, the slave node 200 can correct the baud rate by using the synch field 42 that is transferred from the master node 100. Here, it is preferable for the master node 100 to have "0" supplied to the selector 27 as the baud rate selection signal 102, and to determine the baud rate based on the baud rate set value 35.

The baud rate generator 12A according to the present invention measures the synch field 42 by using the synch field measuring timer 23, and dynamically corrects the baud rate by the baud rate correcting circuit 24A. Therefore, there is no generation of overhead as the processing time of the CPU 10, so that the wait time 43 set between the synch field 42 and the ID field 44 can be shortened. As a result, the transfer speed can be improved. Further, since the baud rate correcting process is not executed by the CPU 10, the load imposed upon the CPU 10 can be reduced.

The baud rate generator 12A according to the present invention can correct the baud rate by selectively using the baud rate set value 35 set by the CPU 10 and the baud rate correction value 34 that is obtained by measuring the synch field 42. Therefore, the baud rate generator 12A of the present invention can be provided to both the master node 100 and the slave node 200. Further, it would be needless to say that the serial communication system of the present invention may employ a configuration in which the baud generator 12A is provided only to the slave node 200. However, it is more preferable to use the master node 100 of the present invention, when a serial communication system is built in which the baud generator 12A can be used for both of the master node and the slave node.

Second Embodiment

Next, the serial communication system according to a second embodiment of the present invention will be described with reference to FIGS. 9 and 10. Referring to FIG. 2, the serial communication system according to the second embodiment includes a baud rate generator 12B as the baud rate generator 12. The description of the configuration and operation of components having the same reference numerals as those of the first embodiment will be omitted.

Figure 9:
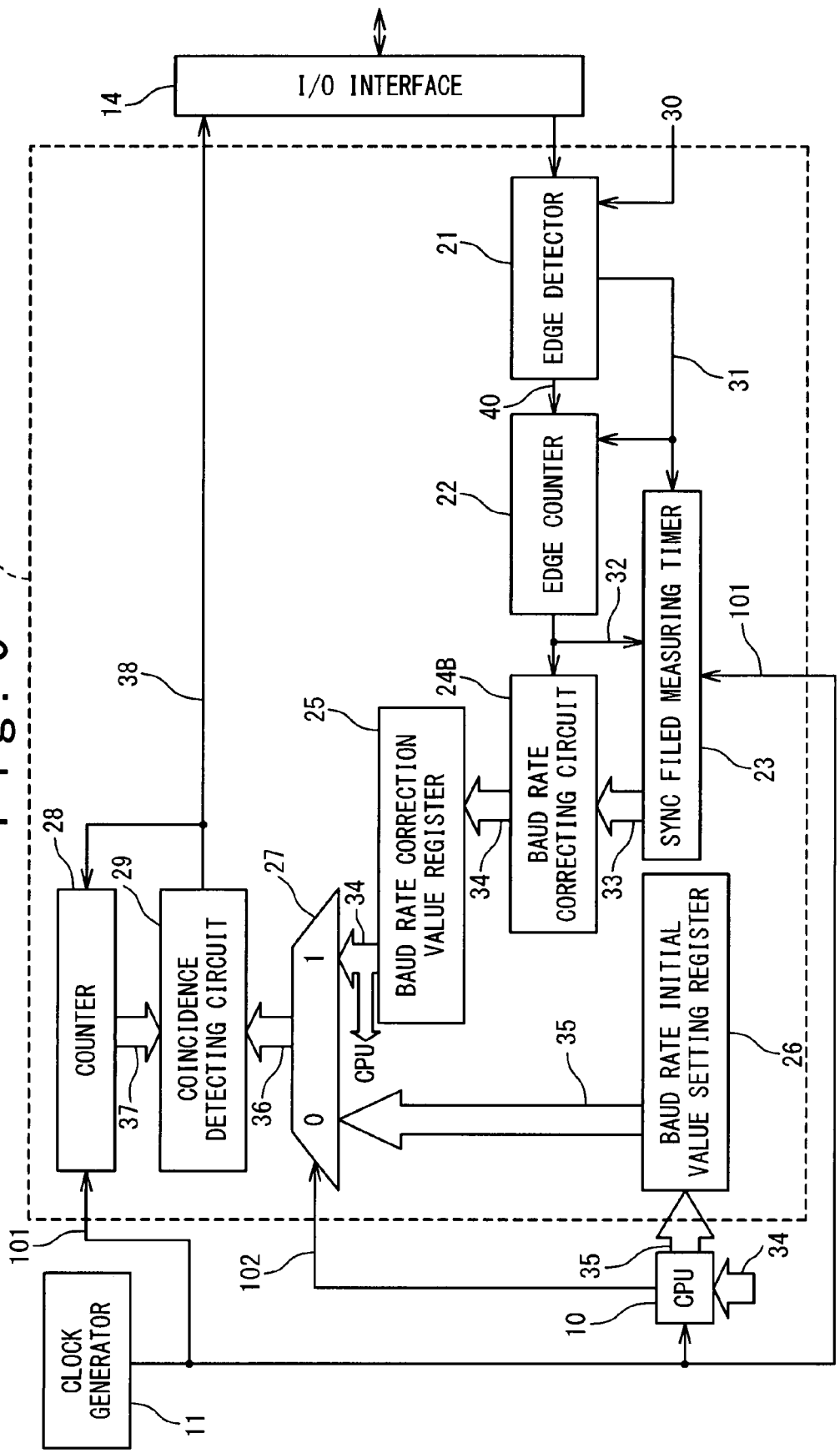
FIG. 9 is a block diagram showing the configuration of a baud rate generator in the serial communication system according to a second embodiment of the present invention.

FIG. 9 is a block diagram showing the configuration of the baud rate generator 12B according to the second embodiment. Referring to FIG. 9, the baud rate generator 12B of the second embodiment includes a baud rate correcting circuit 24B, instead of the baud rate correcting circuit 24A of the first embodiment. FIG. 10 is a block diagram showing the configuration of the baud rate correcting circuit 24B of the second embodiment. Referring to FIG. 10, the baud rate correcting circuit 24B of the second embodiment includes a correction value generating circuit 241, a correction upper limit register 242, comparators 244 and 245, a correction lower limit register 243, and a selector 246B. As in the first embodiment, the correction value generating circuit 241 of the second embodiment extracts the ½-bit period data from the measurement time 33, and outputs it to the selector 246B as a first correction value 34A for baud rate correction. In the correction upper limit register 242 and the correction lower limit register 243, the CPU 10 sets the limit values for preventing the corrected baud rate from being largely shifted from the target baud rate. A correction upper limit set value 34B as a second correction value for baud rate correction is set in the correction upper limit register 242, and a correction lower limit set value 34C as a third correction value for baud rate correction is set in the correction lower limit register 243. For example, the values increased or reduced by 10% of the baud rate set value 35 are set as the correction upper limit set value 34B and the correction lower limit set value 34C. Specifically, when the baud rate set value 35 is a value indicating 160 clk period "1010_0000B", a value "1011_0000B" indicating 176 clk period is set as the correction upper limit set value 34B. Also, a value "1001_0000B" indicating the 144 clk period is set as the correction lower limit set value 34C. Hereinafter, the description will be given, provided that the second correction value is the correction upper limit set value 34B, and the third correction value is the correction lower limit set value 34C.

The first correction value 34A, the correction upper limit set value 34B, and the correction lower limit set value 34C are supplied to the selector 246B from the correction value generating circuit 241, the correction upper limit register 242, and the correction lower limit register 243, respectively. The selector 246B selects and outputs the baud rate correction value 34 to be stored in the baud rate correction value register 25 from the first correction value 34A, the correction upper limit set value 34B, and the correction lower limit set value 34C based on comparison results C1 and C2 that are outputted from the comparators 244 and 245, respectively. The comparator 244 compares the first correction value 34A and the correction upper limit set value 34B, and outputs the comparison result C1. Similarly, the comparator 245 compares the first correction value 34A and the correction lower limit set value 34C, and outputs the comparison result C2.

For example, when the first correction value 34A is larger than the correction upper limit set value 34B, the comparator 244 outputs "1" as the comparison result C1, and outputs "0" when it is equal to or smaller than the value 34B. Similarly, when the first correction value 34A is smaller than the correction lower limit set value 34C, the comparator 245 outputs "1" as the comparison result C2, and outputs "0" when it is equal to or larger than the value 34C. That is, when the first correction value 34A is within a range of the correction upper limit set value 34B and the correction lower limit set value 34C, "00" is supplied to the selector 246B as a combination of the comparison results C1 and C2 obtained by the comparators 244 and 245, and the first correction value 34A is selectively outputted as the baud rate correction value 34. Also, when the first correction value 34A exceeds the correction upper limit set value 34B, "10" is supplied to the selector 246B as a combination of the comparison results C1 and C2 obtained by the comparators 244 and 245, and the correction upper limit set value 34B is selectively outputted as the baud rate correction value 34. Further, when the first correction value 34A is a value smaller than the correction lower limit set value 34C, "01" is supplied to the selector 246B as a combination of the comparison results C1 and C2 obtained by the comparators 244 and 245, and the correction lower limit set value 34C is selectively outputted as the baud rate correction value 34.

As described above, when the first correction value 34A is deviated from the set upper limit value or the lower limit value, the baud rate can be corrected by using the upper limit value or the lower limit value instead of the first correction value 34A. That is, the baud rate correcting circuit 24B of the present embodiment can correct the baud rate by using the correction upper limit set value 34B or the correction lower limit set value 34C, when the measurement time 33 cannot be obtained accurately due to failure, noise, or the like generated on the bus 300 as a transmission path.

The baud rate generator 12B of the slave node 200 corrects the baud rate based on the synch field 42 that is transferred from the master node 100. The baud rate generator 12B in the second embodiment is different from the first embodiment in the extracting operation of the baud rate correction value 34 performed in the baud rate correcting circuit 24B. The extracting operation of the baud rate correction value 34 performed in the baud rate correcting circuit 24B will be described hereinafter.

Figure 10:
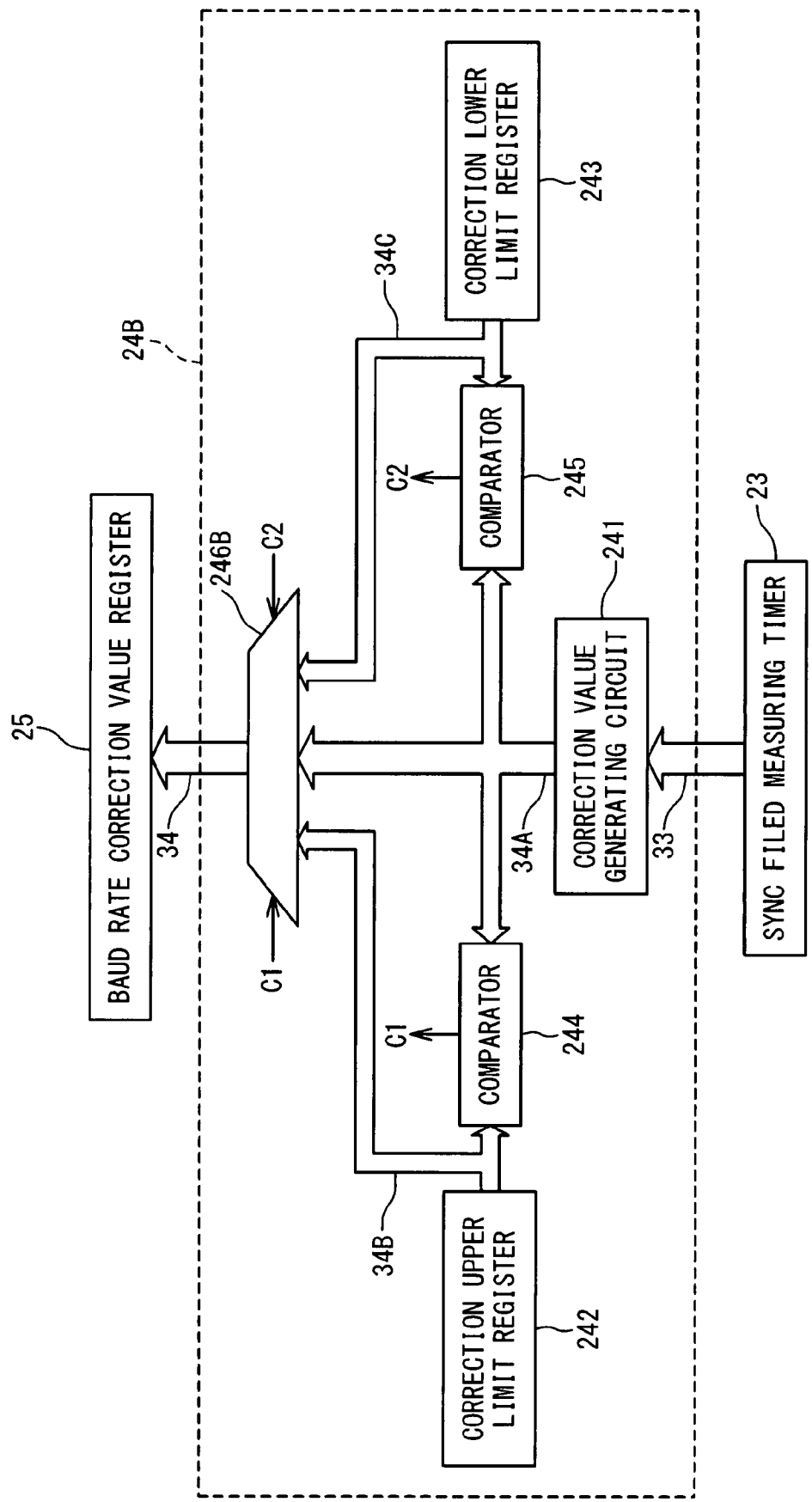
FIG. 10 is a block diagram showing a baud rate correcting circuit in the second embodiment of the present invention.

Referring to FIG. 10, when receiving the measurement time 33 from the synch field measuring timer 23, the correction value generating circuit 241 of the second embodiment outputs the first correction value 34A to the selector 246B, the comparator 244, and the comparator 245 in response to the synch field end signal 32. When the measurement time 33 is "1010_0010_1000B", the correction value generating circuit 241 discards the lower 4 bits, and outputs the high 8 bits "1010_0010B" (=162 clk) as the first correction value 34A, as in the first embodiment. It is assumed herein that "1011_0000B" is set in the correction upper limit register 242 as the correction upper limit set value 34B, and "1001_0000B" is set in the correction lower-value register 243 as the correction lower limit set value 34C.

The comparator 244 compares the first correction value 34A and the correction upper limit set value 34B. Since the first correction value 34A is smaller, the comparator 244 outputs "0" to the selector 246B. Further, the comparator 245 compares the first correction value 34A and the correction lower limit set value 34C. Since the first correction value 34A is larger, the comparator 245 outputs "0" to the selector 246B. The selector 246B selectively outputs the first correction value 34A "1010_0010B" as the baud rate correction value 34 based on "00" as the combination of the comparison results C1 and C2 obtained by the comparators 244 and 245. The output value thereof is stored in the baud rate correction value register 25.

Also, when the first correction value 34A exceeds the correction upper limit set value 34B, the comparator 244 outputs "1" to the selector 246B as the comparison result C1. The selector 246B selectively outputs the correction upper limit set value 34B "1011_0000B" as the baud rate correction value 34 based on "1" as the comparison result C1. The output value is stored in the baud rate correction value register 25. Alternatively, when the first correction value 34A is below the correction lower limit set value 34C, the comparator 246B outputs "1" to the selector 246B as the comparison result C2. The selector 246B selectively outputs the correction lower limit set value 34C "1001_0000B" as the baud rate correction value 34 based on "1" that is the comparison result C2. The output value thereof is stored in the baud rate correction value register 25.

The coincidence detecting circuit 29 outputs the coincidence detection signal 38 to the I/O interface 14 based on the baud rate correction value 34 stored in the baud rate correction value register 25, as in the first embodiment.

As described above, the baud rate generator 12B according to the second embodiment can prevent the corrected baud rate from being largely shifted from the target baud rate set in advance, since there are the upper limit and the lower limit set for the baud rate correction value 34 that is used for dynamically correcting the baud rate.

Third Embodiment

Next, the serial communication system according to a third embodiment of the present invention will be described with reference to FIGS. 11 and 12. Referring to FIG. 2, the serial communication system according to the third embodiment includes a baud rate generator 12C as the baud generator 12. The description of the configuration and operation of the components having the same reference numerals as those of the first and second embodiments will be omitted.

Figure 11:
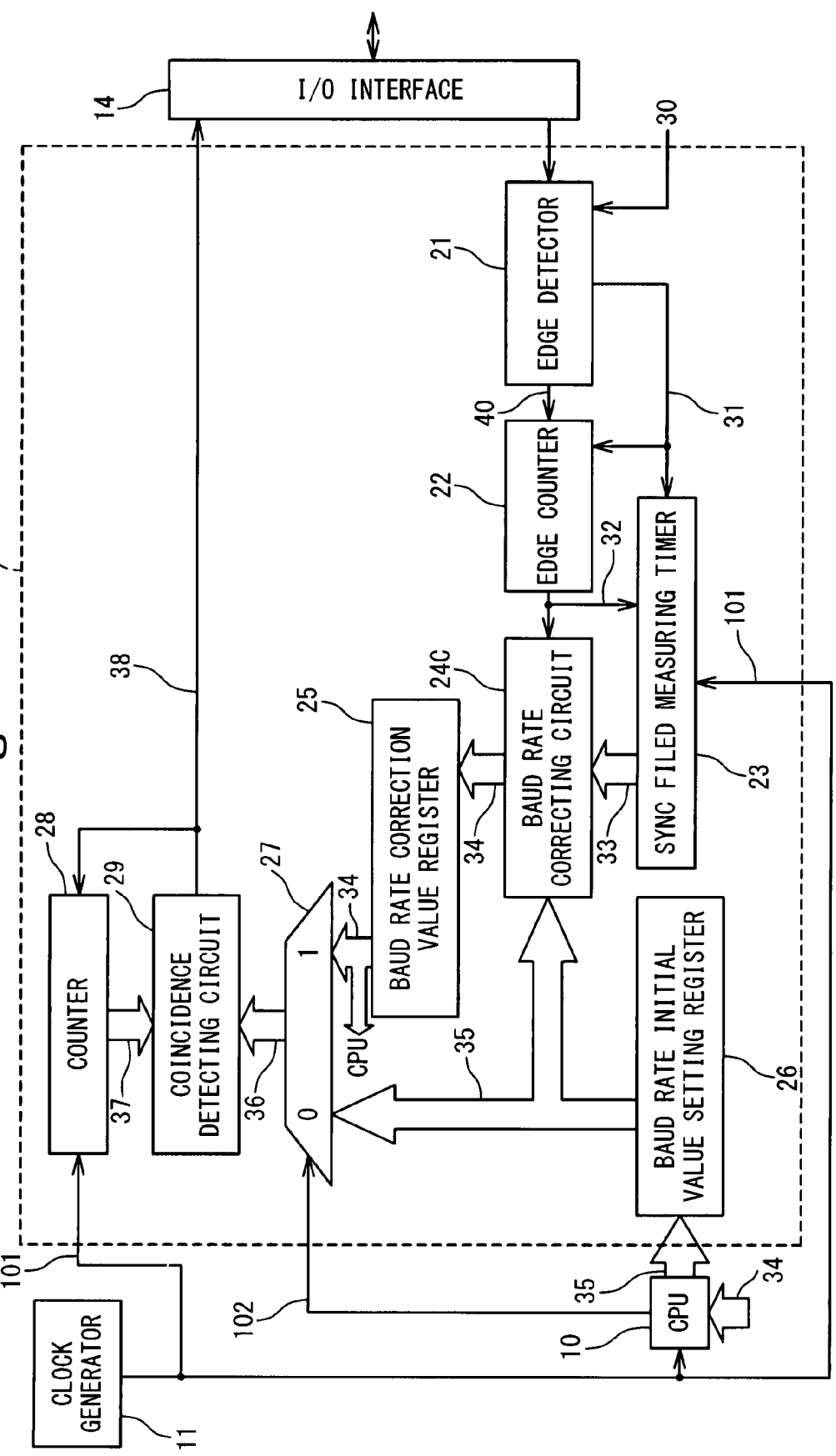
FIG. 11 is a block diagram showing the configuration of a baud rate generator in the serial communication system according to a third embodiment of the present invention.

FIG. 11 is a block diagram showing the configuration of the baud rate generator 12C according to the third embodiment. Referring to FIG. 11, the baud rate generator 12C of the third embodiment includes a baud rate correcting circuit 24C instead of the baud rate correcting circuit 24A of the first embodiment. Further, the baud rate set value 35 is supplied to the baud rate correcting circuit 24C of the present embodiment from the baud rate initial value setting register 26.

Figure 12:
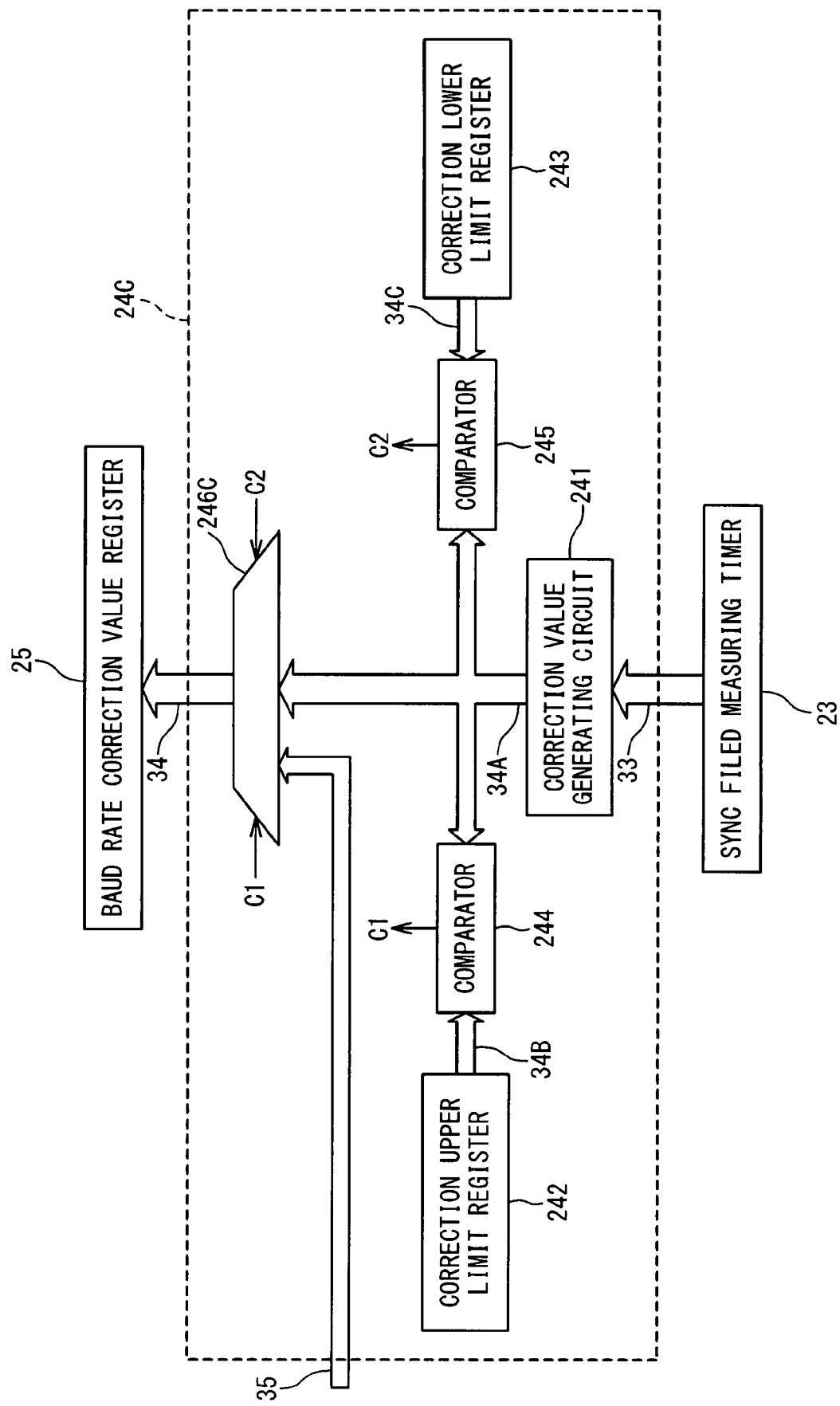
FIG. 12 is a block diagram showing the configuration of a baud rate correcting circuit in the third embodiment of the present invention.

FIG. 12 is a block diagram showing the configuration of the baud rate correcting circuit 24C according to the third embodiment. Referring to FIG. 12, the baud rate correcting circuit 24C of the third embodiment includes a selector 246C instead of the selector 246B of the second embodiment. Further, the baud rate set value 35 is supplied to the selector 246C from the baud rate initial value setting register 26. Furthermore, as in the second embodiment, the correction value generating circuit 241 extracts the ½-bit period data from the measurement time 33, and outputs it to the selector 246C as the first correction value 34A.

The configurations of the comparator 244 and the comparator 245 are the same as those of the second embodiment. The selector 246C selectively outputs either the baud rate set value 35 or the first correction value 34A as the baud rate correction value 34, based on the comparison results C1 and C2 which are obtained by the comparators 244 and 245. The output value thereof is stored in the baud rate correction value register 25.

When the first correction value 34A is within a range of the correction upper limit set value 34B and the correction lower limit set value 34C, the first correction value 34A is selectively outputted as the baud rate correction value 34. Further, when the first correction value 34A exceeds the correction upper limit set value 34B, the baud rate set value 35 is selectively outputted as the baud rate correction value 34. Furthermore, when the first correction value 34A is smaller than the correction lower limit set value 34C, the baud rate set value 35 is selectively outputted as the baud rate correction value 34.

As described above, when the first correction value is deviated from the set upper limit value or the lower limit value, the baud rate is corrected by using the baud rate set value 35 for designating the target baud rate set by the CPU 10 in advance, instead of the first correction value 34A. That is, the baud rate correcting circuit 24C of the present embodiment can correct the baud rate by using the baud rate set value 35 set by the CPU 10, when the measurement time 33 cannot be obtained accurately due to failure, noise, or the like generated on the transmission path.

The baud rate generator 12C of the slave node 200 corrects the baud rate based on the synch field 42 of the frame header transferred from the master node 100. The baud rate generator 12C of the third embodiment is different from that of the second embodiment in the extracting operation of the baud rate correction value 34 performed in the baud rate correcting circuit 24C. The extracting operation of the baud rate correction value 34 performed by the baud rate correcting circuit 24C will be described hereinafter.

Referring to FIG. 12, when receiving the measurement time 33 from the synch field measuring timer 23, the correction value generating circuit 241 of the third embodiment outputs the first correction value 34A to the selector 246C, the comparator 244, and the comparator 245 in response to the synch field end signal 32, as in the second embodiment.

The comparator 244 compares the first correction value 34A and the correction upper limit set value 34B, and outputs "0" or "1" to the selector 246C as the comparison result C1.

Further, the comparator 245 compares the first correction value 34A and the correction lower limit set value 34C, and outputs "0" or "1" to the selector 246C as the comparison result C2.

When the combination of the comparison results C1 and C2 obtained by the comparators 244 and 245 is "00", i.e., when the first correction value 34A is the value within the range of the correction upper limit set value 34B and the correction lower limit set value 34C, the selector 246C selectively outputs the first correction value 34A to the baud rate correction value register 25 as the baud rate correction value 34. Further, when the first correction value 34A exceeds the correction upper limit set value 34B, the comparator 244 outputs "1" to the selector 246C as the comparison result C1. The selector 246C selectively outputs the baud rate set value 35 to the baud rate correction value register 25 as the baud rate correction value 34, based on "1" as the comparison result C1. Alternatively, when the first correction value 34A is below the correction lower limit set value 34C, the comparator 245 outputs "1" to the selector 246C as the comparison result C2. The selector 246C selectively outputs the baud rate set value 35 to the baud rate value register 25 as the baud rate correction value 34, based on "1" that is the comparison result C2.

The coincidence detecting circuit 29 outputs the coincidence detection signal 38 to the I/O interface 14 based on the baud rate correction value 34 stored in the baud rate correction value register 25, as in the first embodiment.

As described above, the baud rate generator 12C according to the third embodiment can prevent the corrected baud rate from being largely shifted from the target baud rate set in advance, since the upper limit and the lower limit set for the baud rate correction value 34 are used for dynamically correcting the baud rate, as in the second embodiment.

Although the embodiments of the present invention have been described above, it could be understood to a skilled person in the art that the present invention is not limited the above specific configurations but various modifications and changes are possible without departing from the scope of the present invention. The present invention have been described by referring to the serial communication system that includes a single master node 100. However, the present invention can also be applied to the serial communication system that includes a plurality of master nodes. In such a case of multi-master system, it is necessary for the slave node 200 to dynamically correct the baud rate for each master node. Further, there may be cases where a synch brake field is received from another master node in the middle of a LIN communication format. Thus, the number of times of the baud rate correction in such a case increases compared to a case of a single master node 100. According to the present invention, it is possible to reduce the overhead of processing by the CPU in the conventional technique, and to reduce the load on the CPU further. In addition, although the synch field according to the present invention is described as being the serial data of 0x55 value, it is not limited thereto. In such a case, it is sufficient that the counter value of the edge counter at a timing of outputting the synch field end signal 32 is changed.

Further, in the second and the third embodiments, when the first correction value 34A is out of the range between the correction upper limit set value 34B and the correction lower limit set value 34C, the selector 246B (246C) may keep the output value as it is without changing the output value of the baud rate correction value 34. In such a case, when the accurate measurement time 33 cannot be obtained, the baud rate generator 12B (12C) does not perform the baud rate correction, and holds the current baud rate.

Furthermore, the baud rate correcting circuit according to the present invention may be formed as a combination of the second embodiment and the third embodiment. Specifically, the baud rate set value 35 is supplied from the baud rate initial value setting register 26 to the selector 246B according to the second embodiment, and the baud rate correction value 34 is selected from the baud rate set value 35, the first correction value 34A, the correction upper limit set value 34B, and the correction lower limit set value 34C based on the extent of the first correction value 34A. For example, the baud rate correcting circuit can determine the baud rate correction value 34 while switching the operation of the second embodiment and the operation of the third embodiment through the control of a flag set by a circuit (not shown).

Moreover, the second and third embodiments have been described by referring to a case of having the comparator 244 and the comparator 245 for comparing the first correction value 34A and the second correction value (correction upper limit set value 34B) or the third correction value (correction lower limit set value 34C). However, it is not necessary to provide two separate comparators in the configuration, but a single comparator may be employed. Further, the second correction value 34B and the third correction value 34C are not limited to be set by the CPU 10 but may be set as fixed values by the circuit in advance.

Although the present invention has been described above in connection with several embodiments thereof, it will be apparent to those skilled in the art that those embodiments are provided solely for illustrating the invention, and should not be relied upon to construe the appended claims in a limiting sense.

What is claimed is:

1. A baud rate generator comprising:
   a first counter configured to count bits of an inputted serial data;
   a timer configured to measure a time for which said first counter counts a predetermined number of bits based on a reference clock signal; and
   a baud rate correcting circuit configured to output a baud rate correction value based on said measurement time by said timer such that a baud rate in a serial communication is corrected based on said baud rate correction value.

2. The baud rate generator according to claim 1, further comprising:
   a second counter configured to count said reference clock signal; and
   a coincidence detecting circuit configured to output a coincidence detection signal when the count value by said second counter and said baud rate correction value as a selection value are coincident with each other.

3. The baud rate generator according to claim 2, further comprising:
   a first register configured to hold said baud rate correction value outputted from said baud rate correcting circuit;
   a second register configured to hold an initial value of a baud rate;
   a first selector configured to select one of said baud rate correction value in said first register and said initial value in said second register to output to said coincidence detecting circuit as said selection value,
   wherein said coincidence detection circuit outputs a said coincidence detection signal when said selection value from said first selector and the count value by said second counter are coincident with each other.

4. The baud rate generator according to claim 1, wherein said measurement time by said timer is a binary value, and said baud rate correcting circuit generates said baud rate correction value based on an upper portion extracted from said measurement time.

5. The baud rate generator according to claim 2, wherein said baud rate correcting circuit comprises:
   a correction value generating circuit configured to generate a first correction value from said measurement time by said timer;
   a third register configured to hold a second correction value as an upper limit value of said baud rate;
   a fourth register configured to hold a third correction value as a lower limit value of said baud rate; and
   a second selector configured to select one of said first correction value, said second correction value and said third correction value to output to said coincidence detecting circuit as said selection value.

6. The baud rate generator according to claim 5, wherein said baud rate correcting circuit further comprises:
   a comparator configured to compare said first correction value and said second correction value, or said first correction value and said third correction value, and
   said second selector outputs said selection value based on the comparison result by said comparator.

7. The baud rate generator according to claim 6, wherein said second selector selects and outputs said second correction value as said selection value, when said first correction value is larger than said second correction value.

8. The baud rate generator according to claim 6, wherein said second selector selects and outputs said third correction value as said selection value, when said first correction value is smaller than said third correction value.

9. The baud rate generator according to claim 6, wherein said second selector selects and outputs said first correction value as said selection value, when said first correction value is between said second and third correction values.

10. The baud rate generator according to claim 6, wherein the initial value held in said second register is supplied to said second selector, and
    said second selector selects and outputs the initial value as said selection value, when said first correction value is out of a range between said second and third correction values.

11. The baud rate generator according to claim 6, wherein said second selector holds said selection value, when said first correction value is out of a range between said second and third correction values.

12. The baud rate generator according to claim 1, wherein said serial data is a synchronous byte in a sync field which is based on a LIN (Local Interconnect Network) communication protocol.

13. A serial communication apparatus comprising:
    a clock generator configured to generate a reference clock signal;
    an I/O interface circuit configured to operate in response to a coincidence detection signal;
    a CPU executing a program for a slave task; and
    a baud rate generator,
    wherein said baud rate generator comprises:
    a first counter configured to count bits of a serial data received by said I/O interface circuit;
    a timer configured to measure a time for which said first counter counts a predetermined number of bits based on a reference clock signal; and
    a baud rate correcting circuit configured to output a baud rate correction value based on said measurement time such that a baud rate of a serial communication in said I/O interface circuit is corrected based on said baud rate correction value.

14. The serial communication apparatus according to claim 13, further comprising:
a second counter configured to count said reference clock signal from said clock generator;
a coincidence detecting circuit configured to output a coincidence detection signal when the count value by said second counter and said baud rate correction value as a selection value are coincident with each other;
a first register configured to hold said baud rate correction value outputted from said baud rate correcting circuit;
a second register configured to hold an initial value of the baud rate which is set by said CPU;
a first selector configured to select one of said baud rate correction value in said first register and said initial value in said second register to output to said coincidence detecting circuit as said selection value,
wherein said coincidence detection circuit outputs a said coincidence detection signal when said selection value from said first selector and the count value by said second counter are coincident with each other.

15. The serial communication apparatus according to claim 13, wherein the measurement time by said timer is a binary value, and
said baud rate correcting circuit generates said baud rate correction value based on an upper portion extracted from the measurement time.

16. The serial communication apparatus according to claim 13, wherein said baud rate generator comprises:
a second counter configured to count said reference clock signal from said clock generator;
a coincidence detecting circuit configured to output a coincidence detection signal when the count value by said second counter and said baud rate correction value as a selection value are coincident with each other;
a correction value generating circuit configured to generate a first correction value from the measurement time by said timer;
a third register configured to hold a second correction value as an upper limit value of said baud rate;
a fourth register configured to hold a third correction value as a lower limit value of said baud rate; and
a second selector configured to select one of said first correction value, said second correction value and said third correction value to output to said coincidence detecting circuit as said selection value.

17. The baud rate generator according to claim 16, wherein said baud rate correcting circuit further comprises:
a comparator configured to compare said first correction value and said second correction value, or said first correction value and said third correction value, and
said second selector outputs said baud rate selection value based on the comparison result by said comparator.

18. The baud rate generator according to claim 17, wherein said second selector selects said second correction value as said selection value, when said first correction value is larger than said second correction value,
said second selector selects said third correction value as said selection value, when said first correction value is smaller than said third correction value, and
said second selector selects said first correction value as said selection value, when said first correction value is between said second and third correction values.

19. A method of correcting a baud rate in a serial communication in a serial communication system comprising at least a master node and a plurality of slave nodes, said method comprising:
transmitting a serial data from said master node to said plurality of slave nodes; and
correcting a baud rate in each of said plurality of slave nodes,
wherein said correcting a baud rate comprises:
receiving said serial data;
counting bits of the received serial data received;
generating a reference clock signal;
measuring a time for which a predetermined number of bits are counted, from the reference clock signal;
determining a baud rate correction value based on said measurement time; and
correcting said baud rate based on said baud rate correction value as a selection value and said reference clock signal.

20. The method according to claim 19, wherein said correcting said baud rate based on said baud rate correction value and said reference clock signal, comprises:
generating a first correction value from said measurement time;
selecting one of said first correction value, a second correction value as an upper limit value of said baud rate and a third correction value as a lower limit value of said baud rate, as said selection value.

* * * * *